No. 841,096. PATENTED JAN. 8, 1907.
C. ROUSE.
SUPPORT FOR CONVEYER BELTS.
APPLICATION FILED NOV. 26, 1906.

Witnesses
Mary E. Moore.
G. M. Spring.

Inventor
Charles Rouse,
By David P. Moore.
Attorney

UNITED STATES PATENT OFFICE.

CHARLES ROUSE, OF PITTSBURG, PENNSYLVANIA.

SUPPORT FOR CONVEYER-BELTS.

No. 841,096.  Specification of Letters Patent.  Patented Jan. 8, 1907.

Original application filed March 22, 1905, Serial No. 251,374. Divided and this application filed November 26, 1906. Serial No. 345,172.

*To all whom it may concern:*

Be it known that I, CHARLES ROUSE, a citizen of the United States, residing at Pittsburg, in the county of Allegheny and State of Pennsylvania, have invented certain new and useful Improvements in Supports for Conveyer-Belts, of which the following is a specification, reference being had therein to the accompanying drawings.

My present invention relates to improvements in supports for conveyer-belts; and the main object of my invention is the provision of a support having a plurality of angularly-arranged rollers the supporting-surfaces of which conform to the natural curvature of the belt, the central roller being made in a series of independent sections. With this object in view attention is invited to the accompanying drawings, in which—

Figure 1:
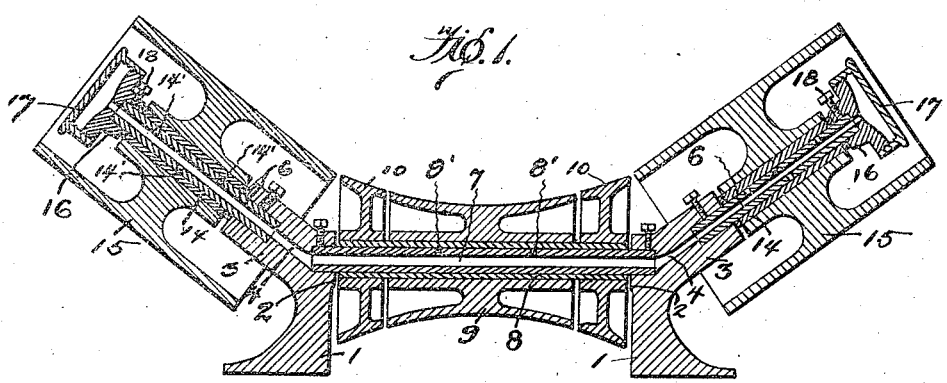
Figure 2:
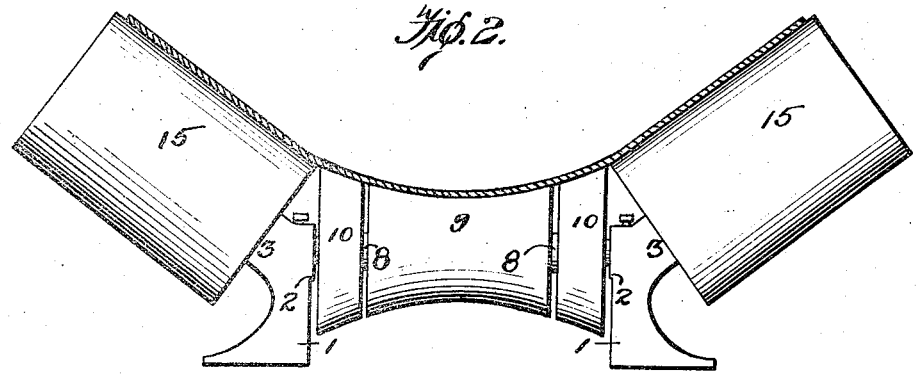

Figure 1 is a horizontal sectional view taken through the support, showing my construction. Fig. 2 is an elevation thereof.

Referring to the drawings, the numeral 1 designates the brackets, which are arranged in pairs and so disposed that the inner projections 2 oppose each other, while the outer upwardly-inclined projections 3 extend outwardly in opposite directions. The bore 4 is formed in these projections, terminating in the enlarged portions for the reception of the tubular shafts 6 and 7, the shaft 7 connecting the brackets together and having mounted thereon a bushing or bearing 8 for the reception of the central concaved roller or pulley 9 and the two outer rollers or pulleys 10, whose outer surfaces are inclined inwardly and aline with the concaved surface of the central pulley. The brackets 1 are provided with a small projection 2, the hollow shaft extending a distance in the bracket, so as to provide proper bearing-surface for the long bushing upon which are journaled these three pulleys.

In order to properly oil the rollers or pulleys 9, 10, and 15, the shafts 6 and 7 are provided with openings 8' and 14'. The rollers or pulleys 15 are rotatably mounted upon the bushings 14 and are secured in place by means of the shoulder 16, carried by the grease-cups 17, which are secured to the outer end of the shafts 6 by means of the set-screws 18. These pulleys 15 simply provide a surface whereby the outer edges of the belt A are turned upwardly to cause the belt to be concaved in cross-section, while the central and outer sections of the center pulley provide a greater inclination and allow the central roller or section, which is smaller than the other pulleys, to revolve at a greater speed, as the circumference is smaller than the others.

I have found by experience that when a single central pulley is employed there is a great amount of friction, because of the central pulley being smaller in diameter than the outer pulleys. It must revolve faster or slide or cause a sliding motion against the surface of the belt farthest from the center, and I have therefore designed the present construction to overcome this difficulty.

From the foregoing description, taken in connection with the drawings, it is evident that I provide a novel construction of belt-conveyer support.

What I claim as new, and desire to secure by Letters Patent, is—

1. A support for a conveyer-belt, comprising a plurality of angularly-arranged rollers having the supporting-surfaces thereof conforming to the natural curvature of the belt thereon, the central roller being made in a series of sections free to rotate independently of each other and having their surfaces upon a curved line, the angular rollers being of the same diameter throughout their lengths.

2. A supporting means for conveyer-belts, comprising a plurality of angularly-arranged rollers, the central one of which is made in a series of sections and provided with a concaved surface, the sections of which are journaled independently to each other and are inclined so that their surfaces form a connecting-link between the curvature of the central roller and the angularly-arranged rollers, said angularly-arranged rollers being cylindrical in shape and of equal diameters.

3. A support for conveyer-belts, comprising a pair of brackets, outwardly-inclined bearings carried thereby, a roller mounted upon each, a central bearing connecting the brackets together, and a central roller composed of a series of independently-rotatable sections mounted upon said connecting-bearing.

4. A support for conveyer-belts, consisting of a series of shafts suitably supported, the outer ones being arranged at an angle to the center one, a group of independently-rotatable rollers of different diameters mounted upon the center shaft, and a single roller mounted upon each angular shaft, the peripheries of all rollers uniting to form a concaved bearing for the surface of the conveyer-belt.

In testimony whereof I affix my signature in presence of two witnesses.

CHARLES ROUSE.

Witnesses:
F. A. BRINKMAN,
W. S. GREEN.